United States Patent [19]

Cabagnero

[11] 4,094,531
[45] June 13, 1978

[54] FOLDABLE STROLLER FOR CHILDREN

[75] Inventor: Ramon Jane Cabagnero, Barcelona, Spain

[73] Assignee: Jane, S.A., Barcelona, Spain

[21] Appl. No.: 756,974

[22] Filed: Jan. 5, 1977

[30] Foreign Application Priority Data

Jan. 14, 1976 Spain .................................... 218.173

[51] Int. Cl.² ............................................. B62B 7/02
[52] U.S. Cl. ................................. 280/649; 280/450
[58] Field of Search ................ 280/42, 647, 649, 650; 297/44, 45, 42, 377

[56] References Cited

U.S. PATENT DOCUMENTS

| | | | |
|---|---|---|---|
| 3,142,351 | 7/1964 | Green | 280/42 |
| 3,976,309 | 8/1976 | Montanelli | 280/650 |
| 4,007,947 | 2/1977 | Perego | 280/650 |

*Primary Examiner*—Robert R. Song
*Attorney, Agent, or Firm*—Toren, McGeady and Stanger

[57] ABSTRACT

A foldable stroller for children is disclosed having a back formed by several longitudinal rigid and padded portions which are articulated together by means of folds. Two supporting divider portions which articulatedly connect the back supports with the frame, permit two degrees of inclination for the back. The stroller is strengthened by the employment of front and rear, articulated crossed rods. The folding control of the stroller is effected by a pair of cross pieces split into two articulated sections and a common control bar. The cross pieces are placed between the side supports of the back. When unfolded, the cross pieces support the back. The control bar, when raised, operates to fold the stroller.

7 Claims, 5 Drawing Figures

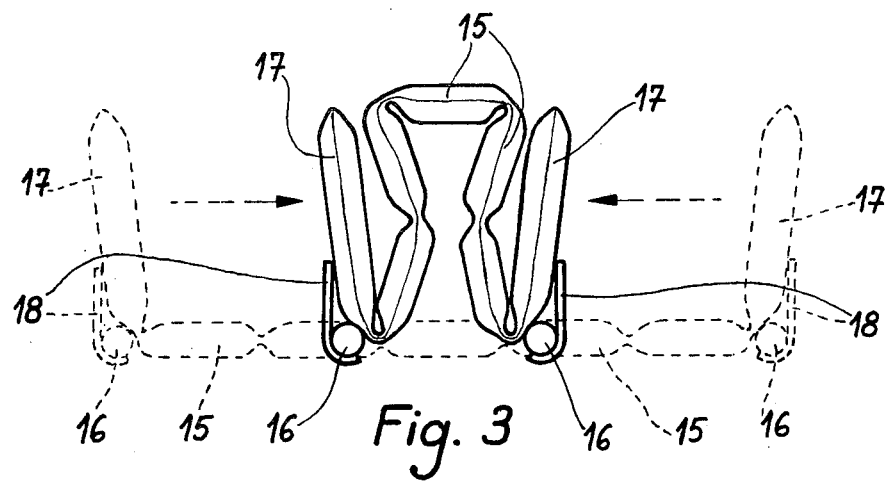
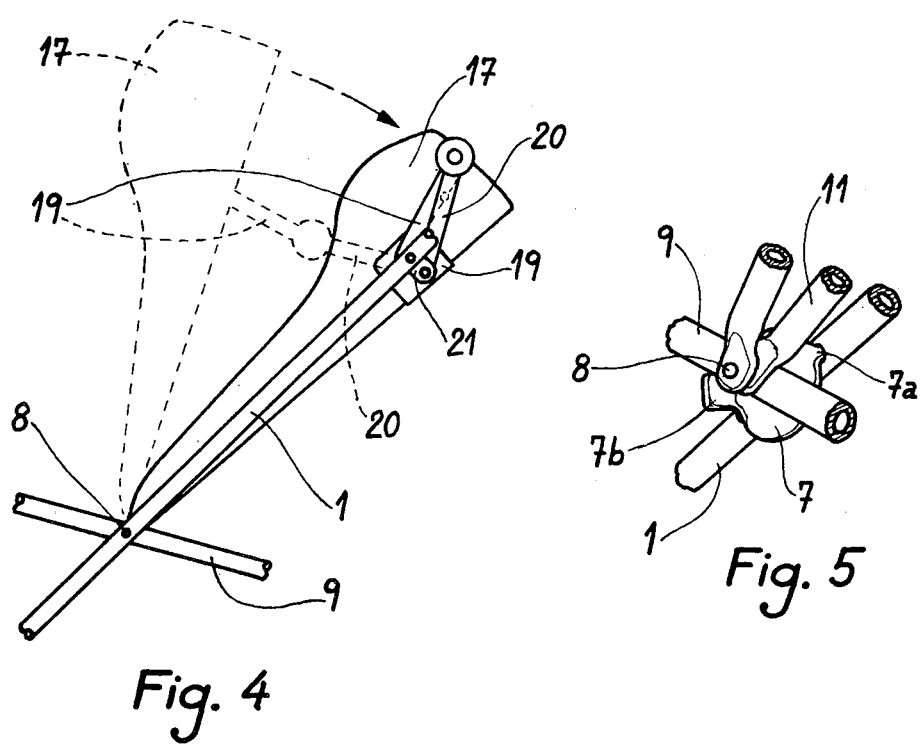

FOLDABLE STROLLER FOR CHILDREN

FIELD OF THE INVENTION

The present invention relates to a foldable stroller for children, and, more particularly, a foldable stroller offering advantages with respect to support for the stroller and flexibility of use.

BACKGROUND OF THE PRESENT INVENTION

Foldable strollers for children have previously had insufficient back support or were often insufficiently sturdy or flexible. The present invention is intended to overcome the deficiencies of prior art constructions and provide numerous advantageous features in this regard.

It is an object of the present invention, therefore, to provide a stroller having a foldable back with substantially greater rigidity than previously.

It is another object of the present invention to provide a foldable stroller having a back which can assume positions having more than one degree of inclination.

It is a further object to provide a foldable stroller having supporting structure which is particularly strong.

It is still a further ofject of the present invention to provide a foldable stroller having a simplified folding control assembly.

It is yet another object of the present invention to provide a foldable stroller having simplified articulations and greater ease of folding.

SUMMARY OF THE INVENTION

The objects of the present invention as well as other unspecified objects are met by certain advantageous construction of the foldable stroller.

Thus, an advantage of the stroller of the present invention is the special structure of its back formed by several rigid and padded portions in the manner of longitudinal strips articulated together by means of folds, so that the back is foldable in zigzag fashion with, its width being very small after it is folded, while when it is unfolded it is very firm and permits comfortable support of a child's back.

On the other hand, the stroller of the present invention is advantageously distinguished by the fact that its back can be positioned into two different degrees of inclination by means of two dividers which articulatedly connect it with the branches of the harness and which can adopt a folded position corresponding to the position of maximum inclination of the back, as well as an unfolded position in which the back adopts a less inclined position.

In another sense, the stroller is very strong in the unfolded position owing to two sets of rods formed by respective pairs of rods articulated crosswire, one of which pairs articulatedly connects the front sections of two lateral seat-supporting elements and the forward sections of the forward wheel-carrying elements, while the other pair of rods articulatedly connects the rear zone of the elements carrying the rear wheels and the branches of the harness.

Additionally, the folding of the assembly is easily obtained owing to a common control bar terminating at the top in a grip and articulated to two rods divided into two sections and articulated to the side-pieces of the back behind the same and with which, at the same time, the unfolded state of the stroller is maintained. The latter, in the folded position, occupies little space and considerably facilitates keeping it and transporting it.

Other advantageous features include the arrangement of the footrest, the grips of the harness and the simplicity of its articulations.

In accordance with the present invention, a foldable stroller comprises a seat and seat back, the seat back being formed by a flexible laminar assembly reinforced lengthwise by juxtaposed strips which provide rigidity and which permit transverse folding in zigzag form. The back includes a frame in which the back is mounted. The frame also includes side-pieces. Articulated front and rear scissor-type wheel-carrying elements are included, the frame side-pieces being articulated in a lower portion thereof to the articulation between the scissor-type wheel carrying elements. A harness formed by a pair of branches is included wherein the side-pieces have upper zones which are connected with the respective branches of the harness by respective articulated divider-type elements. The dividers are provided for opening and closing for determining respective different positions of inclination of the back. The rear wheel-carrying element is situated between the side-piece of the back and the front wheel-carrying element which is in external location. A first set of two articulatedly crossed rods connecting the front wheel-carrying element in a front lower portion thereof with a front upper portion of the rear wheel-carrying elements. A second set of two articulatedly crossed rods connect the front and rear wheel-carrying elements in a rear portion. Two cross-pieces split into two articulated sections are included which connect with the side-pieces of the back and to which are attached a common control means. The cross-pieces are for maintaining the unfolded state of the carriage. The raising of the common control means effects folding of the entire assembly.

For a better understanding of the present invention, reference is made to the following description and accompanying drawings and the scope of the invention will be pointed out in the appended claims.

BRIEF DESCRIPTION OF THE DRAWINGS

In the drawings:

FIG. 3 is a plan view which shows how the folding of the back is performed;

FIG. 4 is a side elevation illustrating how the two different positions of inclination of the back are obtained; and FIG. 5 is a detail in perspective of the assembled articulation on one and the same shaft between the front wheel-carrying lateral elements, the rear wheel-carrying elements, and the side-pieces of the back.

DESCRIPTION OF THE INVENTION

Figure 1:
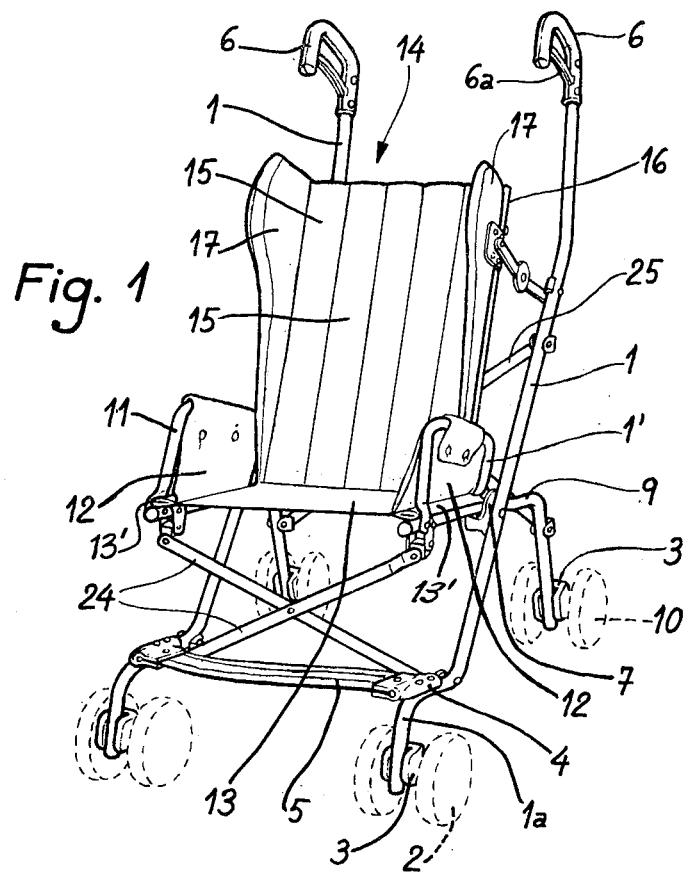
FIG. 1 is a view in perspective of the stroller in an unfolded position of use.

In accordance with the drawings, the stroller of the present invention comprises two inclined lateral elements 1 which form the branches of the harness of the stroller. Elements 1 have a lower end portion 1a which terminates in an inverted L. The inverted L forms the mounting for the double front wheels 2 by way of U-shaped suspension flanges 3 which are articulated to the lower portions 1a and carry the shaft of the wheels and also include an elastic shock-absorber. On the lower portions 1a of the lateral elements 1, respective flanges 4 are applied which present an inverted grooved zone which fits in the portions 1a to which the flanges are joined by rivets. The flanges include respective narrow flattened notches in which are lodged the ends of a flexible strip 5 which constitutes the footrest. The ends of the flexible strip 5 comprise a cylindrical edge which is anchored in a corresponding cylindrical cavity provided in the notches of the flanges in which the ends of the footrest are secured by means of a rivet. At their upper end, the lateral elements 1 have attached thereon respective handles 6 including a cross-piece 6a which defines openings in the handles for the user's hands.

The elements 1 have respective circular plates 7, each of which have a radial tab 7a folded over. The tabs are introduced into slots in element 1 in which they are thus locked without the possibility of rotation of the circular plates. The plates are traversed by a shaft 8 which is fastened to the elements 1. Articulated to the shaft 8 on each side-piece of the stroller is the upper section of an angularly folded element 9 in scissor relation with the corresponding element 1a.

At their lower end, the elements 9 carry double rear wheels 10 mounted in the same manner as the front wheels 2 by way of U-shaped suspension flanges 3. In their upper portion, the elements 9 are supported in the unfolded position of the carriage on respective wings 7b laterally protruding from the circular plates 7 toward the interior. Also on their upper portion, elements 9 have attached to them respective lateral railings 11 which have an inverted U-shape, and which are retained at an end of the rear branch of the U-shape by the same articulation shaft 8 as the elements 1 and 9.

To the railings 11 are secured laminar flexible side-pieces 12 of the seat 13 by the overlap of respective portions of the side-pieces which are provided with snap closures. The seat 13 has two lateral tabs 13' joined to the upper sections of the elements 9. A back 14 is attached to the seat 13, and is formed by several rigid and padded portions 15 which are formed in the manner of strips articulated together along fold zones, as is seen in FIG. 3. The back is joined to two lateral elements 16 which are articulated by their lower end respectively to the same articulation shaft 8 as the elements 1 and 9. The back has two wings 17 to which are connected the respective portions 15 of the back by means of folds.

The lateral elements 16 of the back have attached to them respective small plates 18 to which is articulated one of the arms 19 of two divider-type elements, the other arm 20 being articulated to a lug 21. Lug 21 is integral with the upper portions of elements 1 which form branches of a harness portion of the stroller. This articulated divider-type relation between the back 14 and the branches of the harness permits placing the back in two different positions of inclination. In one such position, the divider elements are extended. In the other position of maximum inclination, they are folded, in which latter position a lateral pin 22 of the arm 20 fits into a small notch 23 provided in the other arm 19 of the divider elements.

By their lower end portions 1a, the lateral elements 1 are articulatedly connected with the front ends of the upper sections of the elements 9 by two rods 24 which cross and are articulatedly fastened together. The elements 1 are articulatedly connected by rear points with the rear sections of the elements 9 by way of two other crossing and mutually articulated rods 25.

Figure 2:
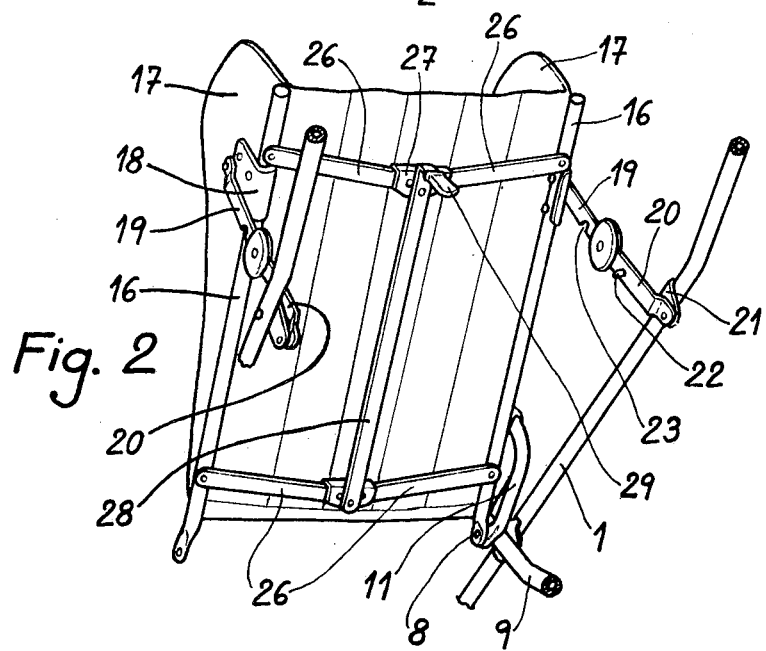
FIG. 2 is a rear view in perspective which illustrates the articulated arrangement of the side-pieces of the back whereby the assembly is actuated for its folding and whereby its unfolded position is maintained.

The side-pieces 16 of the back are articulatedly connected in the rear area thereof by means of two split cross-pieces 26 which are articulated together through respective U-shaped flanges 27 to which, in turn, is articulated a common control bar 28 whose upper end includes an actuating grip 29. In this manner, the split and articulated cross-pieces can be brought into the extended position illustrated in FIG. 2, in which the stroller is maintained unfolded for use. By raising the grip 29, the elements 16 of the back come together laterally, so that the back folds in zigzag form as is indicated in FIG. 3. Further, the elements 1 and 9 come together, at the same time as the sets of rods 24 and 25 close, until the elements of one side-piece of the stroller are juxtaposed to the elements of the opposite side-piece. Thus, the assembly is folded up.

While the present invention has been disclosed with reference to specific illustrative embodiments, it would be obvious to those skilled in the art that other changes and modifications may be made therein without departing from the true spirit and scope of the present invention. It is intended, therefore, that all such changes and modifications as would occur to an individual of skill in the art are encompassed by the scope of the appended claims.

What is claimed is:

1. A foldable stroller comprising:
    a seat and seat back, said seat back being formed by a flexible laminar assembly reinforced lengthwise by juxtaposed strips which provide rigidity and which permit transverse folding in zigzag form; a frame for said back, said back being mounted in said frame, said frame having side-pieces; articulated front and rear scissor-type wheel carrying elements, said frame side-pieces being articulated in a lower portion thereof to the articulation between the scissor-type wheel carrying elements; a harness formed by a pair of branches which are an extension of said front wheel carrying elements, said frame side-pieces being connected with the respective branches of the harness by respective articulated divider-type elements, said divider-type element arranged for opening and closing for determining respective different positions of inclinations of the back, said rear wheel-carrying element being situated between the side-piece of the frame and the front wheel-carrying element which is in external location; a first set of two articulatedly crossed rods for connecting said front wheel-carrying elements in a front lower portion thereof with a front upper portion of the rear wheel-carrying element, a second set of two articulatedly crossed rods for connecting said front and rear wheel-carrying elements in a rear portion; and two cross-pieces split into two articulated sections which connect with the side-pieces of the frame and to which are attached a common control means, the cross pieces maintaining the unfolded state of the carriage; and when raised the common control means effect the folding of the stroller.

2. The foldable stroller of claim 1 wherein said common control means is a bar having an upper grip.

3. The foldable stroller of claim 1 wherein the harness includes hand grips having openings therein.

4. The foldable stroller of claim 1 wherein arm rests are included, which arm rests are affixed to a front portion of said rear wheel-carrying elements and articulated between said side pieces of said frame and rear wheel-carrying elements.

5. The foldable stroller of claim 4 where the seat includes an extended portion which is affixed to said arm rests by way of a snap arrangement.

6. The foldable stroller of claim 1 including a flexible foot rest affixed to lower portions of said front wheel-carrying elements.

7. The foldable stroller of claim 1 wherein said divider-type elements include a protrusion of one of the arms of each divider element and a notch in the other arm of each divider, said protrusion and notch cooperating in a folded position of said divider to effect a predetermined inclination of the back.

* * * * *